United States Patent [19]
Koorn

[11] Patent Number: 5,845,469
[45] Date of Patent: Dec. 8, 1998

[54] MOWING MACHINE WITH AUTOMATIC ADJUSTING MECHANISM

[75] Inventor: Maarten Koorn, Schiedam, Netherlands

[73] Assignee: Maasland, N.V., Maasland, Netherlands

[21] Appl. No.: 744,071

[22] Filed: Nov. 4, 1996

[30] Foreign Application Priority Data

Nov. 7, 1995 [NL] Netherlands ............................ 1001586

[51] Int. Cl.$^6$ .................................................. A01D 34/82
[52] U.S. Cl. ......................... 56/16.4 A; 56/6; 56/10.2 D; 56/16.4 R; 56/DIG. 15
[58] Field of Search ...................... 56/6, 10.2 D, 16.4 A, 56/16.4 D, 10.2 R, 16.4 R, 192, DIG. 15, DIG. 21, 28

[56] References Cited

U.S. PATENT DOCUMENTS

| | | | |
|---|---|---|---|
| 3,659,403 | 5/1972 | Reaves et al. | 56/10.2 R |
| 3,673,779 | 7/1972 | Scarnato et al. | 56/503 |
| 4,094,132 | 6/1978 | Decoene et al. | 56/14.4 |
| 4,188,773 | 2/1980 | Kaetzel | 56/192 |
| 4,233,803 | 11/1980 | Davis et al. | 56/16.4 R X |
| 4,434,605 | 3/1984 | Bailey | 56/16.4 R |
| 4,671,050 | 6/1987 | van der Lely | 56/16.4 |
| 4,739,609 | 4/1988 | Meier et al. | 56/192 |
| 4,803,830 | 2/1989 | Junge et al. | 56/28 |
| 4,896,492 | 1/1990 | Junge et al. | 56/28 |
| 5,326,320 | 7/1994 | von Allwoerden | 460/149 |

FOREIGN PATENT DOCUMENTS

| | | |
|---|---|---|
| 0155063 A2 | 9/1985 | European Pat. Off. . |
| 2328386 | 5/1977 | France . |
| 43 01 821 A1 | 8/1994 | Germany . |
| 8701155 | 12/1988 | Netherlands . |
| WO 90/12492 | 11/1990 | WIPO . |

OTHER PUBLICATIONS

*McGraw+Hill Encyclopedia of Engineering,* 2nd ed., 1993 McGraw+Hill, N.Y. p. 552.

*Primary Examiner*—Harry C. Kim
*Assistant Examiner*—Greg Binda
*Attorney, Agent, or Firm*—Penrose Lucas Albright

[57] ABSTRACT

A mowing machine comprising a mowing unit, a crushing member and an adjusting mechanism, by means of which one or more crushing parameters can be adjusted. At least one sensor is provided, by means of which the extent to which the crushing member is loaded during operation is recorded. This sensor also supplies one or more control signals to the above-mentioned adjusting mechanism to obtain automatic adjustment of the machine's crushing parameters. The adjusting mechanism can adjust the relative positions of the crushing member and the mowing unit, the rpm of the crushing member and the size of the crop channel, among other things.

17 Claims, 3 Drawing Sheets

MOWING MACHINE WITH AUTOMATIC ADJUSTING MECHANISM

FIELD OF INVENTION

The present invention relates to a mowing machine comprising a mowing unit and crushing member, together with an adjusting means for adjusting the crushing characteristics of the crushing member. More particularly, it relates to mowing machine of a type disclosed in the German Offenlegungsschrift DE 4301821 A1, of Krone et al published Aug. 8, 1994.

BACKGROUND OF THE INVENTION

In practice, the thickness or the length or the quantity or the type of the crop to be crushed in a mowing machine or any combination thereof will vary. For example, when long-stemed crop is mowed, the flow of crop to the crushing member increases, whereby the crop may wind around the crushing member or be insufficiently treated by the crushing elements or both, and there is a risk that the crushing member will be jammed or blocked. The load borne by the crushing member during operation may thereby be increased. In the aforementioned German Offenlegungsschrift DE 4301821 A1, a construction is disclosed in which, to obviate this drawback, the relative position of the crushing member and the mowing unit is adjustable.

When the crushing characteristics of the machine prior to putting the machine into operation are adjusted to accommodate the conditions to the crop, nevertheless, during operation, the crushing member may be jammed or blocked and consequently overloaded. The original adjustment may have been incorrect or the quantity of the crop received by the machine may be different in various parts of the plot to be treated.

SUMMARY OF THE INVENTION

For the machine to function well, in accordance with the invention, at least one sensor is provided, by means of which the extent to which the crushing member is loaded during operation is recorded, and the sensor supplies one or more control signals to an adjusting means that automatically adjusts operating parameters of the machine. In other words, depending on the extent to which the crushing member is loaded, the crushing performance of the crushing member and the mowing unit is automatically adjusted. The adjusting means can adjust the relative positions of the crushing member and the mowing unit and/or change the crushing member's RPM and/or adjust the size of the crop channel, etc. In other words, the parameters that are adjusted can relate to the relative position, in particular the distance, between crushing member and the mowing unit, as well as to the intensity of the crushing function, as such, in particular by means of the crushing member's RPM and the size of the crop channel.

BRIEF DESCRIPTION OF THE DRAWINGS

For a better understanding of the invention and to show how it may be carried into effect, reference will now be made, by way of example, to two embodiments shown in the accompanying drawing.

DETAILED DESCRIPTION OF THE PREFERRED EMBODIMENTS

Figure 1:
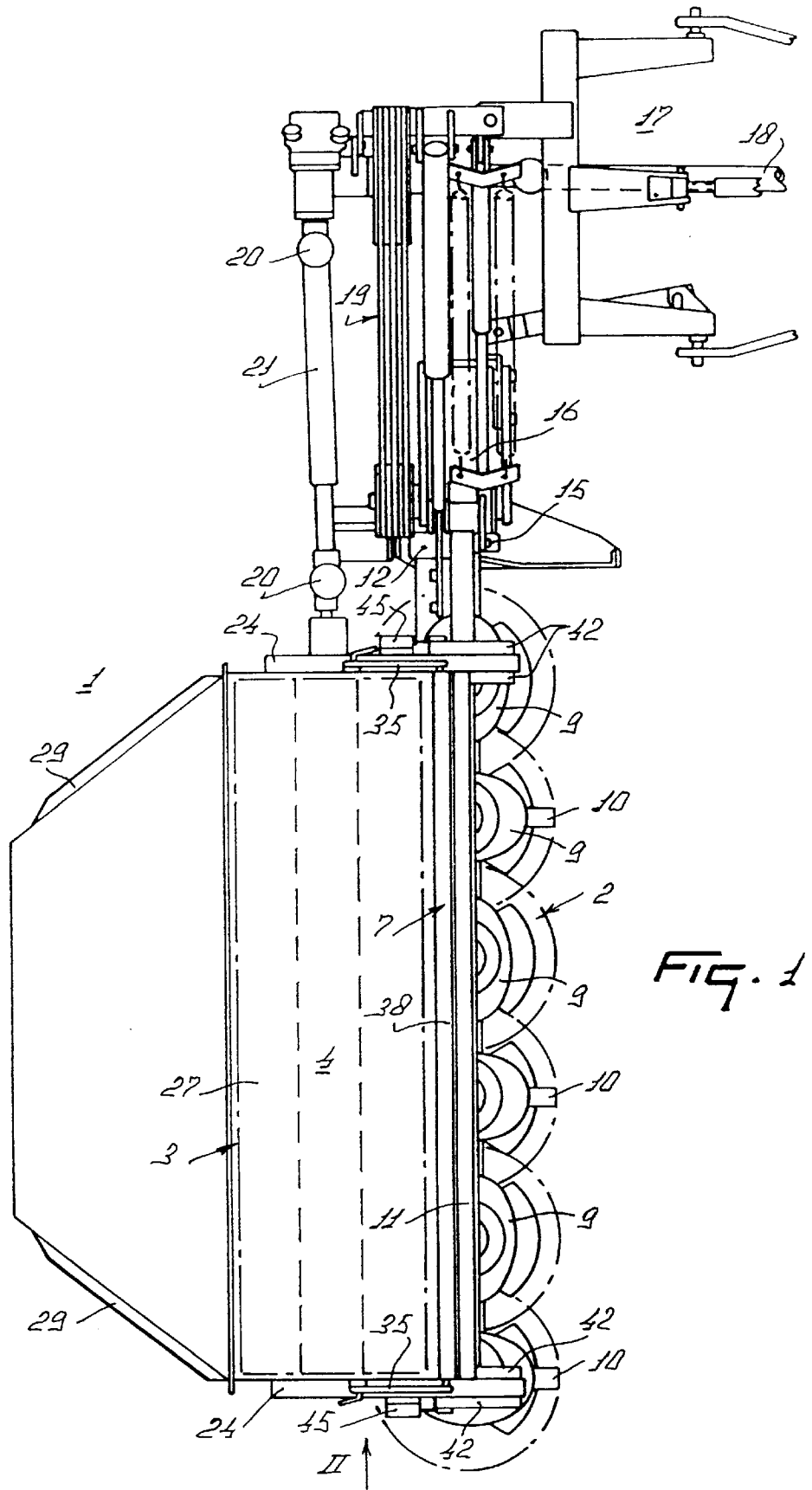
FIG. 1 shows, in plan view, the mowing machine according to the invention.
Figure 2:
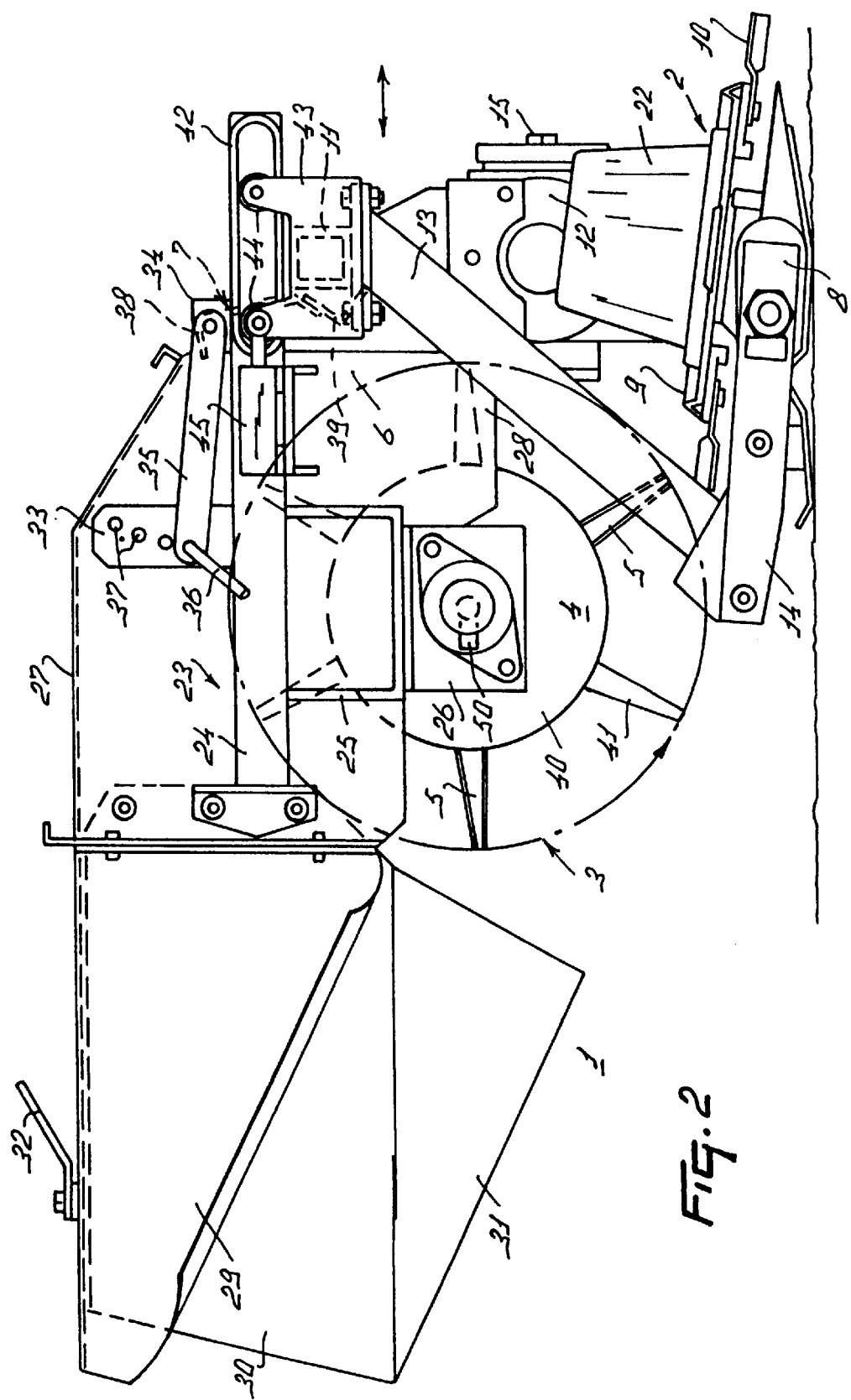
FIG. 2 shows a side elevational view of the mowing machine shown in FIG. 1, whereby the mowing unit is movable.

The mowing machine 1, shown in the figures, comprises a mowing unit 2 and a crushing member 3 including a rotor 4 and crushing elements 5, as well as an element 7 constituting together with said crushing member 3 a crop channel 6.

In the embodiment shown, the mowing unit 2 is composed of a cutter bar 8 including six mowing discs 9 provided with mowing knives 10, pivotable about vertical shafts. Above cutter bar 8 and parallel thereto, is a carrier beam 11. The connection between cutter bar 8 and the carrier beam 11 is constituted at one end by a gear box 12 and at the other end by a supporting element 13, extending obliquely rearwardly and downwardly from carrier beam 11, and a substantially horizontally and forwardly extending connecting element 14 which is connected with said supporting element 13 near the lower end thereof and is also connected with cutter bar 8.

The mowing machine is pivotably connected, in a customary manner, about an approximately horizontal and transverse pivot shaft 15, which, in its operative position, extends in the direction of travel, with a supporting arm 16 including a carrier frame 17, by means of which the mowing machine can be coupled to a three-point lifting hitch of a tractor or similar vehicle. The drive of the mowing machine is from a power take-off shaft 18 of a tractor (not shown), via selected transmission members in gear box 12, connected with supporting arm 16, from which mowing unit 2 is driven by means of a belt transmission 19 and selected transmission members in gear box 12, and crushing member 3 is driven by means of an intermediary shaft 21 provided with universal joints 20.

The outer mowing disc, at the side where the elements 13 and 14 constitute the connection between cutter bar 8 and carrier beam 11, is provided with a hat-shaped crop guide member 22.

A frame 23, constituted by supporting beams 24, a bracket 25 fixed below each one thereof, and an angle plate 26 fixed below said bracket, is interconnected with carrier beam 11. Crushing member 3 is pivotably disposed between the angle plates 26. To frame 23 there are additionally fastened top plate elements 27 and side plate elements 28 and 29. Side plate elements 29 converge inwardly in rearward direction and are outwardly bent at their lower edges. At the inside of side plate elements 29, there are available further side plates 30, which have at their lower sides a portion 31 extending inwardly and which, by means of a handle 32, can be moved further inwardly in order to obtain a required swath definition.

Furthermore, a first support 33 and a second support 34 are fixed to supporting beams 24. By means of a shaft 36 and apertures 37, a connecting bar or strip 35, pivotable in second support 34, can be fixed in the first support 33 in such a way that the position of this connecting element 35, and consequently that of a strip 38 fixed thereto including a beater bar 39 fixed to said strip, extending in the longitudinal direction of the crushing member 3, determine the required size of crop channel 6.

Rotor 4 of crushing member 3 comprises a cylindrical carrier 40, on which the crushing elements 5 are disposed so as to be staggered relative to each other. The crushing elements 5 are tapering, have an I-shaped profile and project outwardly from the roller. The outer crushing elements 41 on both sides of the cylindrical roller 40 are flat, tapering and also project outwardly from the roller. As a result, the outer crushing elements are dagger-shaped and are preferably made of a flat strip or spring steel having a thickness of approximately three millimeters. Seen in plan view, the outer crushing elements 41 are located at a distance of approximately one centimeter from side plate elements 28. Because, during operation, the dagger-shaped outer flat crushing elements 41 move relatively close along side plate elements 28, material to be crushed, that has settled on said side plate elements 28 or has gathered in the angles of the crop channel 6, is cut up. As the crop cut up is wound less easily and can be better discharged, it is avoided that rotor 4 runs roughly and that crop channel 6 and possibly rotor 4 are jammed with crop. The application of a relatively thin strip of spring steel for the outer crushing elements 41 has the advantage that crushing elements 41, seen in the direction of rotation of the rotor 4, are relatively stiff, while the crushing elements 41, in a direction perpendicular to the direction of rotation of rotor 4, on the contrary, can easily deflect and spring back. The latter phenomenon may occur when, for example, undesired objects, such as a piece of wood or a stone, get into rotor 4. It will be obvious, that also more than two dagger-shaped crushing elements 41 can be disposed on cylindrical carrier 40, and that the crushing elements 41 can be made of an other material, having characteristics identical to those of spring steel, such as synthetic material.

Figure 3:
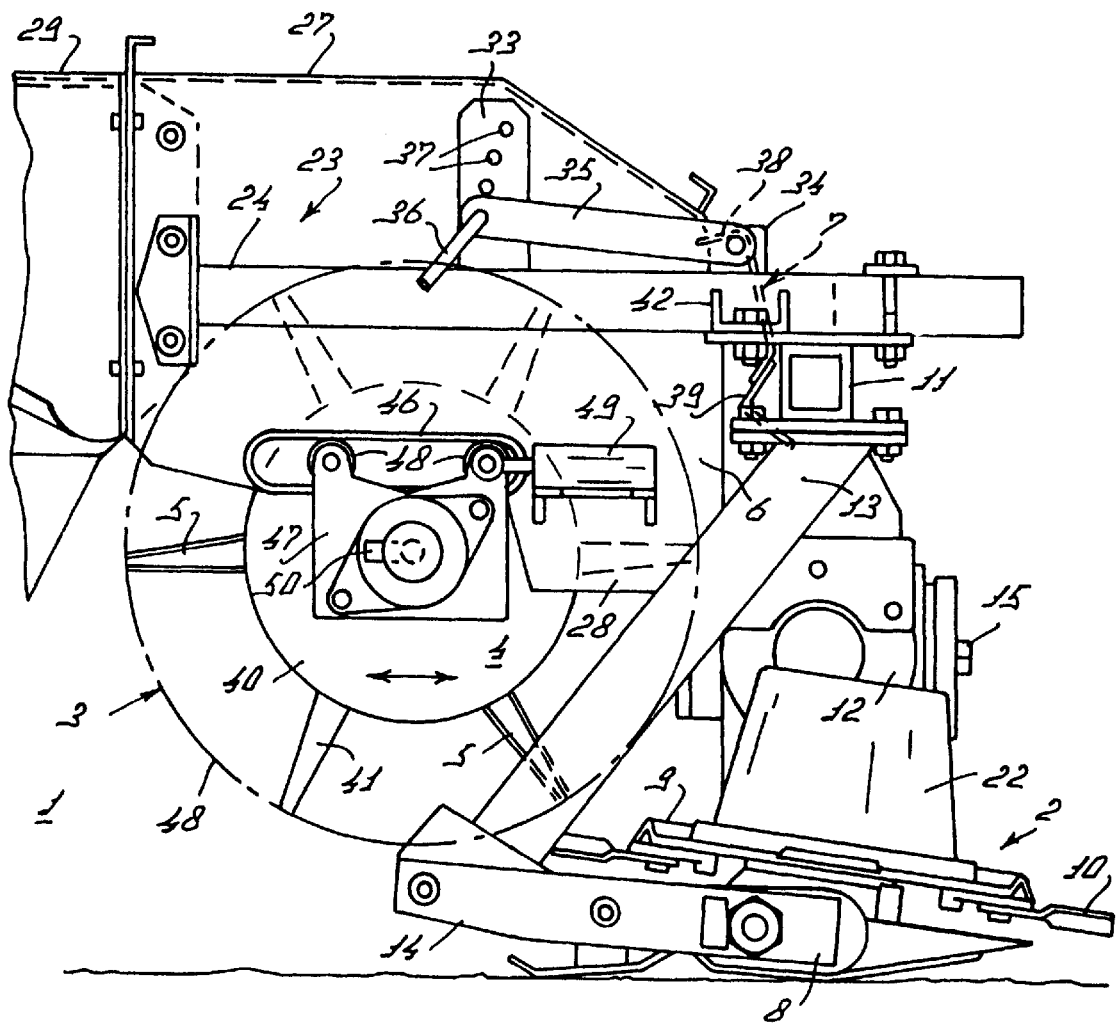
FIG. 3 shows a side view of the version of the mowing machine shown in FIG. 1, where the crushing member is movable.

The frame 23, in which crushing member 3 is pivotably suspended, can be moved relative to cutter bar 8. For that purpose, the two supporting beams 24 comprise near their front a guide means 42, and mowing unit 2 can reciprocate in said guide means 42 by means of supports 43, provided at the ends of carrier beam 11, and rollers 44 fastened thereto. This reciprocating movement can be achieved by means of adjusting means, in particular a control cylinder and piston unit 45, fastened to a supporting beam 24, at one or both sides of the machine. Upon displacing mowing units 2, the positioning of crushing member 3 relative to beater bar 39 remains unchanged. Instead of displacing mowing unit 2, also crushing member 4 can be displaced; this situation is shown in FIG. 3. However, thereby the positioning of crushing member 3 relative to the beater bar 39 does change and consequently the size of crop channel 6 changes as well. In the embodiment of FIG. 3, there is fitted a guide means 46 to each side plate elements 28 at each side of the machine. In this embodiment, crushing member 3 is not directly bearing-supported in side plate elements 28, but in supports 47, which, by means of rollers 48, can reciprocate in the guide means 46. This reciprocating movement is achieved by means of adjusting means, in particular a control cylinder and piston unit 49, fastened to a side plate element 28, at one or both sides of the machine.

As shown in both embodiments, crushing member 4 is provided with a sensor 50, by means of which the extent to which the crushing member is loaded is determined by the flow of crop which it is processing. Control cylinders and piston units 45 and 49 respectively, shown in both embodiments, are controlled from said sensor 50, by means of a control signal supplied by same. At a relatively large flow of crop, the crushing member 3 is loaded to a greater extent when with a relatively small flow of crop, and the distance between mowing unit 2 and the crushing member 3 should be increased. By means of this sensor 50 and control cylinder and piston units 45 and 49, respectively controlled thereby, there is obtained an automatic adjustment of the distance between the mowing unit 2 and the crushing member 3. The sensor 50 can be constituted by various types of sensors; there can be used force meters, i.e. moment meters, based on the function of strain gauges, disposed, at the appropriate places, on the crushing member. Especially due to the drive of crushing member 3 from one lateral side of the machine, there will occur a clearly perceptible torsion in the shaft of the crushing member. Furthermore, there can be used revolutions counters, provided, of course, that same are sufficiently accurate to be able to record relatively small variations in the RPM.

Besides by the automatic adjustment of the mutual distance between crushing member 4 and mowing unit 2, as described above, the crushing performance of the machine can also be adjusted by the application of adjusting means suitable for adjusting the crushing intensity. It is possible, for example, to adjust the crushing intensity by means of a unit for varying the crushing member's RPM. Depending on the crop conditions, at a specific number of revolutions, it will be possible to obtain an optimal crushing of the crop. Of course, the latter unit will then be controlled by control signals supplied by sensor 50. An other possibility consists in that the adjusting means are constituted by a unit for adjusting the size of the crop channel. In the above described embodiment, this can be achieved by the automatic adjustment of strip 88 including beater bar 39. The manual adjustment by means of shaft 36 and support 33 provided with apertures 37 can be replaced by a control cylinder and piston arrangement, controlled by sensor 50, for adjusting the position of connecting element 36 and consequently that of strip 38 including the beater bar 39. Of course, other combinations of the herein described adjusting means are possible as well.

Although I have described the preferred embodiments of my invention, it is to be understood that it is capable of other adaptations and modifications within the scope of the following claims.

Having disclosed my invention, what I claim as new and to be secured by Letters Patent of the United States is:

1. A mowing machine comprising a mowing unit, and only one crushing member which is disposed directly behind said mowing unit, said mowing machine and said crushing member including drive means for connecting to a tractor's power-take-off, adjusting means for adjusting at least one parameter that affects the machine's crushing operations, and at least one sensor that senses the extent to which the crushing member is loaded during operation for recording and performing its crushing function and sending control signals to said adjusting means for the automatic adjustment of said crushing parameter.

2. A mowing machine in accordance with claim 1, comprising a crop channel between said mowing unit and said crushing member for receiving crop being processed to be crushed by said crushing member, said adjusting means comprising means for adjusting the size of said crop channel.

3. A mowing machine in accordance with claim 1, wherein said adjusting means adjusts the crushing intensity of said crushing member on crop being processed by the machine, said sensor supplying control signals for automatically adjusting said crushing intensity.

4. A mowing machine in accordance with claim 3, wherein said adjusting means comprise means for controlling a rpm of said crushing member.

5. A mowing machine in accordance with claim 1, wherein said adjusting means adjusts a parameter of the machine comprising adjustment of a relative position between said crushing member and said mowing unit, said sensor sending control signals to said adjusting means for automatically adjusting said relative position of said crushing member and said mowing unit.

6. A mowing machine in accordance with claim 5, wherein said sensor measures the force that crop being processed through said crushing member exerts against said crushing member relative to said mowing unit.

7. A mowing machine in accordance with claim 5, comprising a pair of side plate elements, said crushing member being movable within said side plate elements, said adjusting means adjusting the distance measured in the direction of operational travel of the machine between said crushing member and said side plate elements.

8. A mowing machine in accordance with claim 7, comprising guide means mounted on said side plate elements, said crushing member being interconnected with and movable relative to said guide means by rollers.

9. A mowing machine in accordance with claim 8, comprising supports, said crushing member being rotatably supported by said supports, said supports being carried by said rollers.

10. A mowing machine in accordance with claim 9, wherein said adjusting means are disposed on at least one of said side plate elements and engage at least one said support.

11. A mowing machine in accordance with claim 5, comprising a frame that supports said crushing member, said parameter comprising the distance between said frame and said mowing unit.

12. A mowing machine in accordance with claim 11, wherein said frame comprises guide means, said mowing unit being movably connected to said guide means by rollers.

13. A mowing machine in accordance with claim 12, wherein said mowing unit comprises a carrier beam, supports disposed at the ends of said carrier beam, said rollers connected to said supports.

14. A mowing machine in accordance with claim 13, wherein said adjusting means are disposed on said frame, said adjusting means engaging at least one of said supports.

15. A mowing machine comprising a first frame supporting a mowing unit having a plurality of rotating blades that cut crop and move it to the rear, only one crushing member which is disposed directly to the rear of said rotating blades and receives and crushes crop cut by said rotating blades, a drive mechanism operatively connecting said mowing unit and said crushing member to a power-take-off of a tractor, a second frame rotatably supporting said crushing member, said crushing member rotating about a substantially horizontal axis, a crop compressing channel between said rotating blades and said crushing member through which the crop cut by said rotating blades is carried to said crushing member to be crushed, an adjustment mechanism for adjusting the size of said channel, said adjustment mechanism interconnecting said first frame and said second frame and being comprised of a cylinder and piston unit connected to rollers received on a guidance track, and a sensor that senses the force exerted by said crop against said crushing member, said sensor sending signals to said adjustment mechanism to retain said force at substantially a desired level by adjusting the size of said channel.

16. A mowing machine comprising a mowing unit supported by a first frame, said mowing unit comprising a movable blade that cuts crop, only one crushing member supported by a second frame, said crushing member disposed directly to the rear of said mowing unit receiving the crop cut by said blade, said crushing member mounted in said second frame to be rotatable about a substantially horizontal axis, drive means connecting a power-take-off of a tractor driving said mowing unit and said crushing member, adjustment means interconnecting said first frame and said second frame to adjust the distance between said mowing unit and said crushing member, sensor means sensing the effect the crop being received by said crushing member from said mowing unit has on the energy required to operate said crushing member, said adjustment means increasing and decreasing said distance as the function of said effect of crop on the energy requirement to operate said crushing member which is being sensed by said sensor.

17. A mowing machine in accordance with claim 16, wherein said adjustment means comprises a cylinder and piston unit that interconnects said first frame with said second frame.

\* \* \* \* \*